(12) United States Patent
Lai et al.

(10) Patent No.: US 7,684,180 B2
(45) Date of Patent: Mar. 23, 2010

(54) COMPUTER SYSTEM WITH VIBRATION ABSORBING CAGE

(75) Inventors: Hsiu-Chang Lai, Taipei Hsien (TW); Ke Sun, Shenzhen (CN); Zhen-Xing Ye, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 113 days.

(21) Appl. No.: 11/923,658

(22) Filed: Oct. 25, 2007

(65) Prior Publication Data

US 2008/0174949 A1   Jul. 24, 2008

(30) Foreign Application Priority Data

Jan. 19, 2007   (CN) .................. 2007 1 0200079

(51) Int. Cl.
*G06F 1/16* (2006.01)

(52) U.S. Cl. .................. 361/679.33; 439/188; 52/410; 62/228.5

(58) Field of Classification Search ............... 439/160, 439/188; 361/679.02, 679.34, 679.43, 679.56; 52/410; 451/41; 62/228.5
See application file for complete search history.

(56) References Cited

U.S. PATENT DOCUMENTS

| 5,907,938 | A  | * | 6/1999 | Sheahan ........................ 52/410 |
| 6,166,901 | A  | * | 12/2000 | Gamble et al. ......... 361/679.34 |
| 7,239,510 | B1 | * | 7/2007 | Lin ........................ 361/679.02 |

* cited by examiner

*Primary Examiner*—Hung V Duong
(74) *Attorney, Agent, or Firm*—Frank R. Niranjan

(57) ABSTRACT

An exemplary computer system includes an enclosure, a cage, a plurality of floppy disk drives, hard disk drives, and optical disk drives received, a system power supply, and a plurality of vibration absorbers. The enclosure includes a bottom wall. The cage is attached to the bottom wall of the enclosure and receives the disk drives, the hard disk drives, the optical disk drives and the system power supply therein. The vibration absorbers are disposed between the bottom wall of the enclosure and the cage.

11 Claims, 2 Drawing Sheets

COMPUTER SYSTEM WITH VIBRATION ABSORBING CAGE

BACKGROUND

1. Field of the Invention

The present invention relates to a computer system with a vibration absorbing cage for holding components.

2. Description of Related Art

A computer system generally includes a plurality of electronic components, such as circuit boards, hard disk drives (HDD), floppy disk drives (FDD), optical disk drives (ODD), and power supplies, some of which are relatively heavy. Those heavy components are often installed within bulky structures to protect the components from vibrations, respectively. Thus, precious space inside the chassis is occupied.

Consequently, what is required is a computer system which can economically and efficiently protect components therein from vibrations.

SUMMARY

In one embodiment, a computer system includes an enclosure, a cage, a plurality of floppy disk drives, hard disk drives, and optical disk drives received, a system power supply, and a plurality of vibration absorbers. The enclosure includes a bottom wall. The cage is attached to the bottom wall of the enclosure and receives the disk drives, the hard disk drives, the optical disk drives and the system power supply therein. The vibration absorbers are disposed between the bottom wall of the enclosure and the cage.

Other advantages and novel features of the present invention will become more apparent from the following detailed description of preferred embodiment when taken in conjunction with the accompanying drawings, in which:

DETAILED DESCRIPTION OF THE INVENTION

Figure 1:
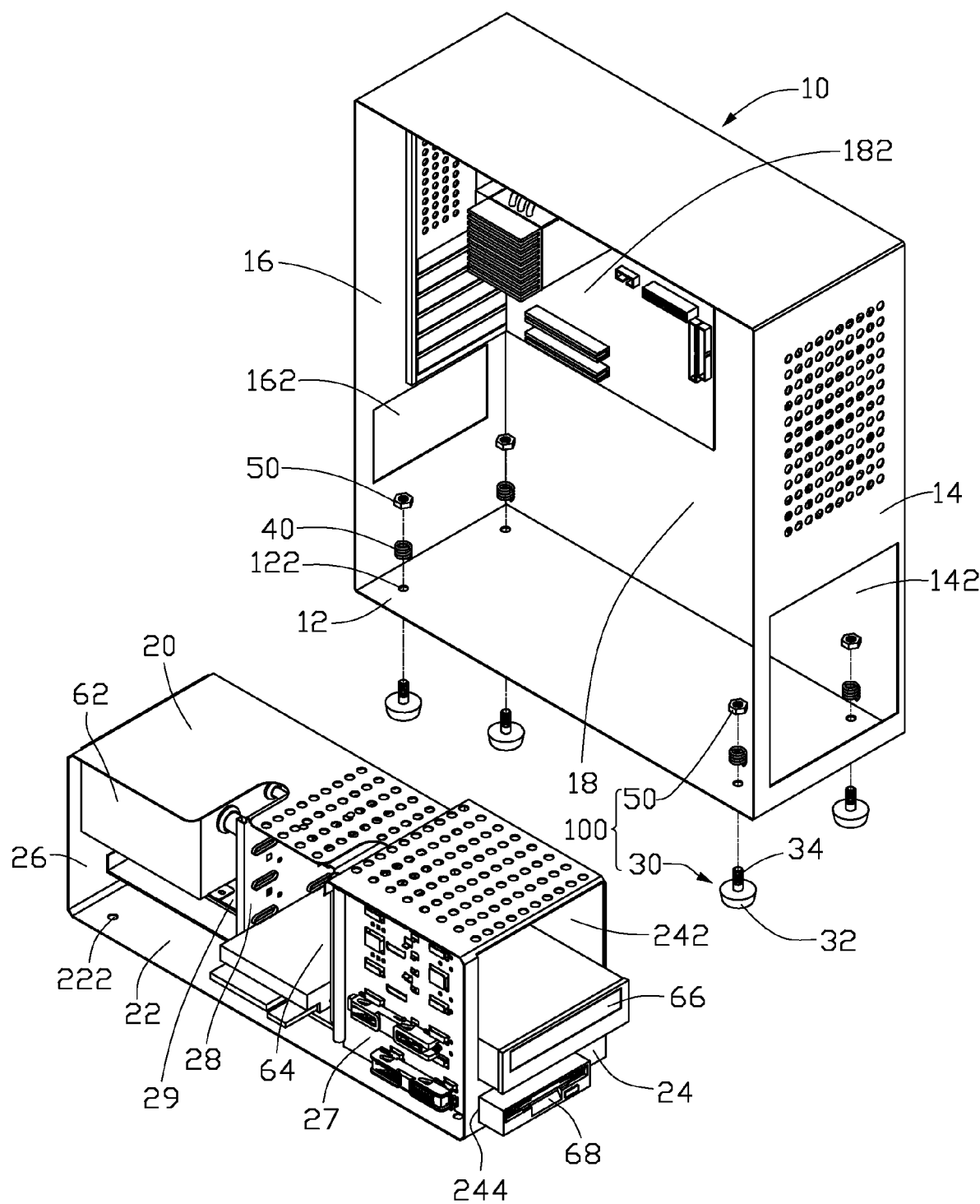
FIG. 1 is an exploded, isometric view of a chassis of an electronic device according to an embodiment of the present invention.

Referring to FIG. 1, in an embodiment of the invention, a computer system includes an enclosure 10, a cage 20, a plurality of fasteners 1 00 fixing the cage 20 in the enclosure 10, and a plurality of vibration absorbers 40. The cage 20 is configured for receiving heavy electronic components of the computer system, such as data storage devices, and power supplies.

The enclosure 10 includes a bottom wall 12, a front wall 14, a rear wall 16, and a sidewall 18. The bottom wall 12 includes four apertures 122 defined in four corners thereof respectively. The front wall 14 includes an opening 142 defined therein. The rear wall 16 includes an opening 162 defined therein. The sidewall 18 includes a circuit board 182 attached thereon.

The cage 20 includes a bottom plate 22, a front plate 24, and a rear plate 26. The front plate 24 and the rear plate 26 are disposed at two opposite sides of the bottom plate 22, respectively. The cage 20 further includes a pair of brackets 27, 28 for retaining a plurality of data storage devices therein, and a plurality of supporting plates 29 disposed between the rear plate 26 and the bracket 27 near the rear plate 26. The data storage devices include optical disk drives 66 received in an upper portion of the bracket 27, a floppy disk drive 68 received in a lower portion of the bracket 27, hard disk drives 64 received in the bracket 28. The front plate 24 includes two openings 242, 244 defined therein, one above the other. The opening 242 is for optical disk drives 66 extending therethrough. The opening 244 is for the floppy disk drive 68 extending therethrough. One of the supporting plates 29 supports a system power supply 62 thereon. The bottom plate 22 includes a plurality of through holes 222 defined in corners thereof, corresponding to the apertures 122 of the enclosure 10.

In this embodiment, each of the fasteners 100 includes a screw 30, and a nut 50. Each of the screws 30 includes a head 32, and a threaded shaft 34 extending from the head 32.

In this preferred embodiment, the vibration absorbers are coiled springs 40.

Figure 2:
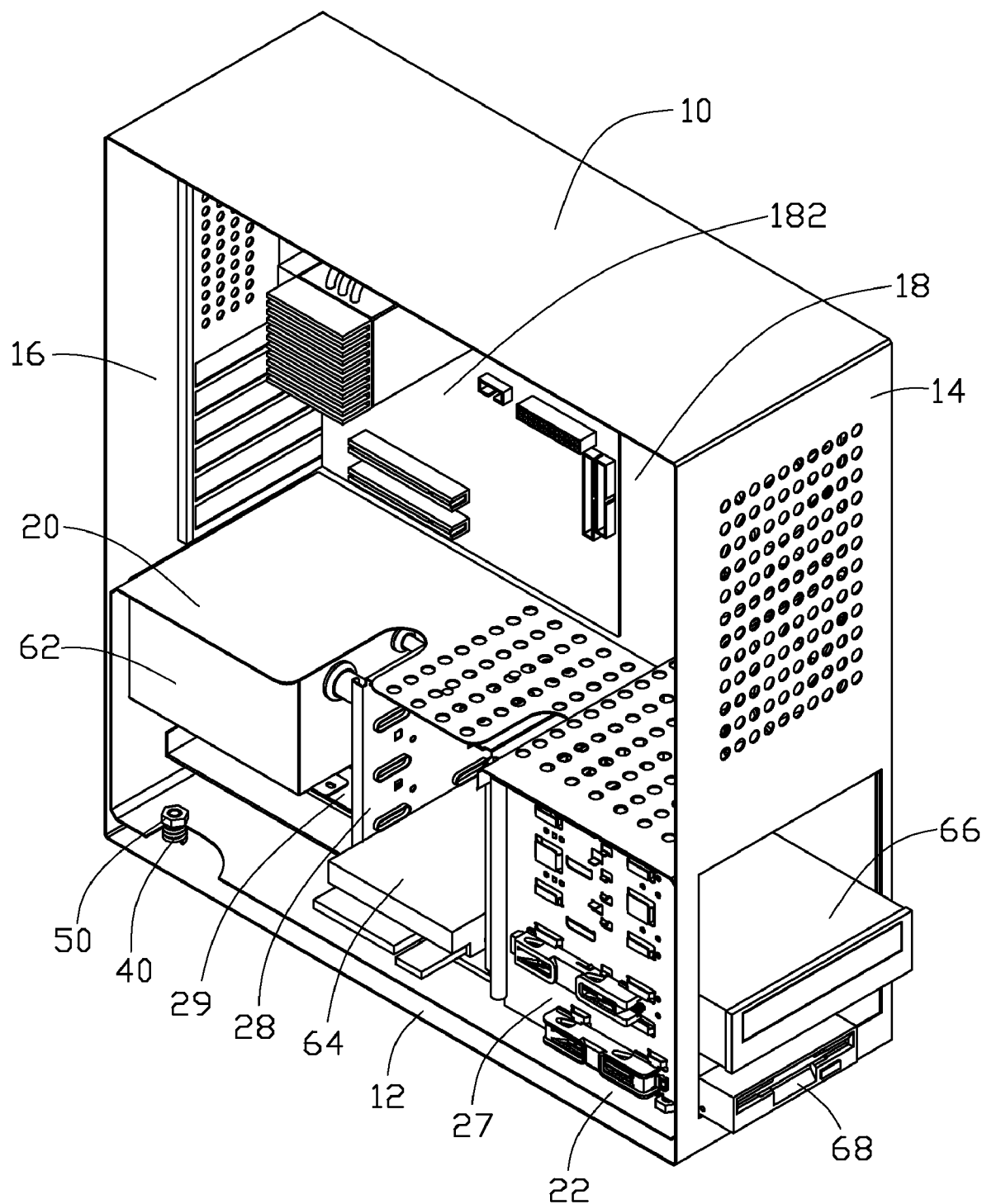
FIG. 2 is an assembled view of the chassis of FIG. 1.

Referring to FIG. 2, in assembly, the screws 30 of the fasteners 100 extend through the apertures 122 of the bottom wall 12 of the cage 20, with the heads 32 abutting a lower surface of the bottom wall 12. The coiled springs 40 are fixed around the shafts 34 of the screws 30, with lower ends contacting an upper surface of the bottom wall 12. The cage 20 is placed on the bottom wall 12 of the enclosure 10, with the shafts 34 of the screws 30 extending through the through holes 222 of the bottom plate 22 of the cage 20 and a lower surface of the bottom plate 20 seated on the springs 40. The nuts 50 threadedly engage with the shafts 34 of the screws 30. Thus, the cage 20 is mounted in the enclosure 10.

The hard disk drives 64, the floppy disk drive 68, the optical disk drives 66, and the system power supply 62, which are heavy electronic components of the computer system, are contained in the cage 20 by brackets 27, 28 and the supporting plate 29. Thus, the center of gravity of the computer system is lowered and focused. Furthermore, the vibration absorbers 40 disposed between the enclosure 10 and the cage 20 along the direction of gravity may absorb vibrations, for protecting computer and prolong life of the computer. The heads 32 of the screws 30 may be made of resilient materials for supporting the computer system on a surface.

The number and location of the vibration absorbers 40 and fasteners 100 may be adjusted according to need. A concavity may be defined in the bottom 12 around each of apertures 122 to accommodate the heads 32 of the screws 30 therein.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer system comprising:
    a computer enclosure comprising a bottom wall;
    a plurality of data storage devices comprising at least one hard disk drive, and at least one optical disk drive;
    a system power supply;
    a cage attached to the bottom wall of the enclosure, and receiving the data storage devices and the system power supply therein; and
    a plurality of vibration absorbers disposed between the bottom wall of the computer enclosure and the cage to absorb vibrations of the data storage devices and the system power supply.
2. The computer system as described in claim 1, further comprising a plurality of fasteners, wherein the cage comprises a bottom plate, each of the fasteners comprises a screw, and a nut, a plurality of apertures is defined in the bottom wall of the enclosure, a plurality of through holes is defined in the bottom plate of the cage, the screws extend through the apertures and the through holes to engage with the nut.

3. The computer system as described in claim 2, wherein each of the screw comprises a threaded shaft, the vibration absorbs are coiled springs fixing around the shafts and sandwiched between the bottom wall and the bottom plate.

4. The computer system as described in claim 3, wherein each of the screws comprises a head disposed at one end of the threaded shaft, the heads of the screws contact an outside surface of the bottom wall of the enclosure.

5. The computer system as described in claim 1, wherein the cage comprises a first bracket at a front portion thereof, a second bracket at a middle portion thereof, and a third bracket at a rear portion thereof configured to receive the system power supply.

6. The computer system as described in claim 5, wherein the first bracket receives the at least one optical disk drive therein, and exposes said optical disk drive through a front wall of the computer enclosure, the second bracket receives the at least one hard disk drive therein, the third bracket comprises at least one supporting plate to support the system power supply thereon.

7. A computer system comprising:
a computer enclosure;
a cage collectively receiving most of heavy electronic components of the computer system therein;
a plurality of fasteners fixing the cage in a lower portion of the enclosure; and
a plurality of vibration absorbers sandwiched between the computer enclosure and the cage along the direction of gravity to absorb vibrations, thereby protecting the heavy electronic components from the vibrations.

8. The computer system as described in claim 7, wherein the computer enclosure comprises a bottom plate with a plurality of apertures defined therein, the cage comprises a bottom plate with a plurality of through holes defined therein, each of the fasteners comprises a screw with threaded shaft, and a nut, the shafts extend through the through holes and the apertures to engage with the nuts, respectively.

9. The computer system as described in claim 8, wherein the vibration absorbers are coiled springs fixing around the threaded shafts of the screws and disposed between the bottom wall of the enclosure and the bottom plate of the cage.

10. The computer system as described in claim 7, wherein said heavy electronic components comprise a plurality of data storage devices, and a system power supply, the data storage devices comprise at least one hard disk drive, and at least one optical disk drive.

11. The computer system as described in claim 10, wherein the cage comprises a pair of side plates perpendicularly arranged at two opposite sides of the bottom plate respectively, the cage further comprises a plurality of brackets configured between the side plates, and at least one supporting plate disposed between one of the side plates and a bracket near said side plate, the data storage devices are retained in the brackets, the system power supply is supported by the supporting plate.

* * * * *